Aug. 30, 1966 E. RENNER 3,269,794
EQUIPMENT FOR EXTENDING THE EFFECTIVE PROJECTION AREA IN
A BACKGROUND PROJECTION SYSTEM FOR PRODUCING
COMPOSITE PHOTOGRAPHIC PICTURES
Filed Aug. 26, 1963
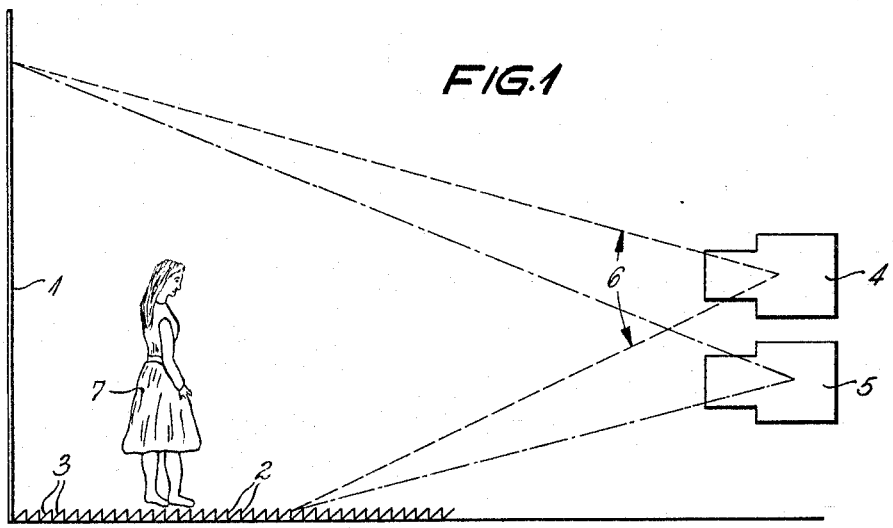
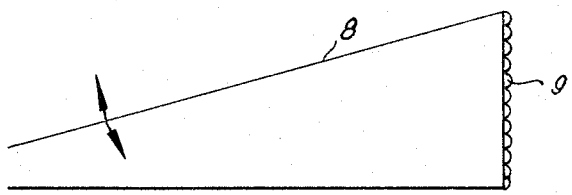
INVENTOR
Eduard Renner
BY Tourover and Browdy
ATTORNEY

United States Patent Office 3,269,794
Patented August 30, 1966

3,269,794
EQUIPMENT FOR EXTENDING THE EFFECTIVE PROJECTION AREA IN A BACKGROUND PROJECTION SYSTEM FOR PRODUCING COMPOSITE PHOTOGRAPHIC PICTURES
Eduard Renner, Feuerbach Strasse 12, Frankfurt am Main, Germany
Filed Aug. 26, 1963, Ser. No. 304,477
Claims priority, application Germany, Aug. 27, 1962, E 23,434
4 Claims. (Cl. 352—89)

This invention is concerned with improvements in or relating to the production of composite images, more particularly with extending a projected background when taking composite photographic pictures where the background is projected on to a screen, especially on to a screen having a reflex reflecting effect.

In proposals known so far for taking composite photographs using a screen on which the desired background is projected the subject, that is to say the person to be photographed, is positioned in front of the background, whether this is in applying the usual method of photography with background projection, or when taking photographs using a screen with a reflex reflecting effect. These proposals suffer from the drawback that according to the distance between the person and the projection screen, and according to the angle of the camera objective, the lower part of the person to be photographed does not appear on the projection screen, so that pictures are produced which are cut off, as it were, and it is an object of the present invention to overcome this disadvantage.

According to one aspect of the present invention, there is provided equipment for extending the effective projection area in a background projection system for producing composite photographic pictures, comprising a support to be placed in front of the projection screen and having one or several first panels arranged to receive part of the incident light beam for the background projection.

The panels which are arranged substantially parallel to the screen and the panels sloping towards the screen are advantageously arranged in the form of the "toothed" edge of a saw.

The panels arranged almost parallel to the screen are conveniently coated with a reflective layer on the side facing the camera, the coating being preferably of the same material as that on the screen.

The angle of inclination of the panels sloping towards the screen may be such as to prevent the panels being perceived by the camera and by the projection apparatus.

Extension of the projected background is obtained by the equipment according to the invention because the light projected by a projector falls on to the substantially vertical panels standing one behind the other.

This way of extending the projected background may be employed for taking photographs both of groups and of single persons as it now makes no difference whether the persons to be photographed are closer to the screen or to the camera.

If the person to be photographed is positioned in the standing area, the projected background picture can be lowered as far as the panels running parallel to the screen, so that persons standing on the platform appear fully on the projected background.

According to a further aspect of the present invention, there is provided a method for the production of composite photographic pictures by means of background projection, especially using projection screens and projection panels whereby parts of the projected image appear on the projection screen and other parts appear on reflective panels placed in front of the projection screen.

Embodiments of the equipment and method according to the present invention will now be particularly described hereinafter with reference to the accompanying drawings, in which:

FIGURE 1 is a diagrammatic illustration of a first equipment for producing composite photographs using a projected background, and FIGURE 2 is a diagrammatic illustration of a further embodiment of the equipment.

Referring to the drawings, the reference numeral 1 denotes a screen on to which a background is projected by means of a projector 5. A camera 4 is focused on to a person 7 to be photographed; the aperture angle of the camera is indicated by the reference numeral 6. The area in front of the screen is subdivided in such a way that there are panels 2 running almost parallel to the screen 1, and other panels 3 sloping towards the screen 1. The panels 2 are coated with a reflective layer which is the same as the reflective coating on the screen 1.

The inclination of the panels 3 is such that they are not perceived by the camera 4, nor by the projection apparatus 5; these only take in the panels 2, whereby extension of the effective area of the projected background is effected.

The arrangement shown in FIGURE 2 provides a simplified possibility of photographing a single subject. A platform 8 which is also coated with a reflective material on its front portion 9 is used as the standing area.

What I claim is:

1. Equipment for extending the effective projection area in a background projection system for producing composite photographic pictures comprising a projection screen and a platform adapted to support the subject being photographed, positioned in front of and adjacent the lower position of said projection screen, said platform comprising at least one panel, each said panel including a reflective surface parallel to said screen for reflecting a part of the incident light beam of said background projection system away from said screen, and an inclined surface extending downwardly from the top of said reflective surface toward said screen, the angle of inclination being arranged so that none of the incident light beam reaches said inclined surface.

2. Equipment according to claim 1 wherein the projection screen as well as the reflective surface of each said panel has a reflective coating of reflex reflecting particles.

3. Equipment according to claim 1 wherein said platform includes a plurality of panels.

4. Equipment according to claim 3 wherein said panels form a saw-tooth shaped platform.

References Cited by the Examiner

UNITED STATES PATENTS

| 1,307,846 | 6/1919 | Brainerd | 352—89 X |
| 1,890,054 | 12/1932 | Grot | 95—82 X |
| 2,076,103 | 4/1937 | Thorner | 352—89 |
| 2,727,429 | 12/1955 | Jenkins | 88—28.9 X |
| 3,034,406 | 5/1962 | McKenzie et al. | 352—89 X |

FOREIGN PATENTS 8,705   1913   Great Britain.

JULIA E. COINER, *Primary Examiner.*
WILLIAM MISIEK, JOHN M. HARAN, *Examiners.*